(12) United States Patent
Kuperschmidt et al.

(10) Patent No.: US 7,936,774 B2
(45) Date of Patent: May 3, 2011

(54) METHOD AND DEVICES FOR MULTICASTING INFORMATION OVER A NETWORK THAT APPLIED A DISTRIBUTED MEDIA ACCESS CONTROL SCHEME

(75) Inventors: Yefim Kuperschmidt, Or Yehuda (IL); Tamar Danon, Tel Aviv (IL)

(73) Assignee: Wisair Ltd., Tel Aviv (IL)

( * ) Notice: Subject to any disclaimer, the term of this patent is extended or adjusted under 35 U.S.C. 154(b) by 886 days.

(21) Appl. No.: 11/043,456

(22) Filed: Jan. 25, 2005

(65) Prior Publication Data

US 2005/0237965 A1 Oct. 27, 2005

Related U.S. Application Data

(63) Continuation of application No. PCT/IL2005/000021, filed on Jan. 6, 2005.

(60) Provisional application No. 60/535,436, filed on Jan. 8, 2004, provisional application No. 60/535,621, filed on Jan. 8, 2004.

(51) Int. Cl.
*H04J 7/212* (2006.01)
*H04J 3/00* (2006.01)
*H04J 3/06* (2006.01)

(52) U.S. Cl. ............ 370/442; 370/498; 370/503

(58) Field of Classification Search .......... None
See application file for complete search history.

(56) References Cited

U.S. PATENT DOCUMENTS

| | | | | |
|---|---|---|---|---|
| 5,365,551 A | * | 11/1994 | Snodgrass et al. | 375/141 |
| 6,256,317 B1 | * | 7/2001 | Holloway et al. | 370/447 |
| 6,810,428 B1 | * | 10/2004 | Larsen et al. | 709/238 |
| 6,952,456 B1 | * | 10/2005 | Aiello et al. | 375/295 |
| 6,965,607 B1 | * | 11/2005 | Landberg et al. | 370/442 |
| 6,980,541 B2 | * | 12/2005 | Shvodian | 370/346 |
| 7,450,558 B2 | * | 11/2008 | Shvodian | 370/346 |
| 2003/0231656 A1 | * | 12/2003 | Wahl | 370/468 |
| 2004/0054767 A1 | * | 3/2004 | Karaoguz et al. | 709/223 |
| 2004/0203348 A1 | * | 10/2004 | Haartsen et al. | 455/41.1 |
| 2005/0058116 A1 | * | 3/2005 | Palin et al. | 370/345 |
| 2006/0268931 A1 | * | 11/2006 | Sella | 370/468 |

* cited by examiner

*Primary Examiner* — Ayaz R Sheikh
*Assistant Examiner* — Blanche Wong
(74) *Attorney, Agent, or Firm* — Reches Patents

(57) ABSTRACT

A method for multicasting information, the method includes: utilizing a distributed media access control scheme for allocating at least one timeslot for a transmission of information from a first device to a group of peer devices and for a transmission of acknowledgement messages from the peer devices of the group; and transmitting the information in response to the allocation. A computer readable medium having code embodied therein for causing an electronic device to perform the stages of: utilizing a distributed media access control scheme for allocating at least one timeslot for a transmission of information from a first device to a group of peer devices and for a transmission of acknowledgement messages from the peer devices of the group; and transmitting the information in response to the allocation. A device including a medium access controller adapted to participate in a distributed media access control scheme that allocates at least one timeslot for a transmission of information from the device to a group of peer devices and for a transmission of acknowledgement messages from the peer devices of the group; and transmission circuitry adapted to transmit the information in response to the allocation.

32 Claims, 9 Drawing Sheets

| DEVID_C 262 | TAM1 270 | DEVID_B 260 | TAM2 272 | DEVID_D 264 | TAM3 274 | DEVID_E 266 | TAM6 276 |
|---|---|---|---|---|---|---|---|

| DEVID_C 262 | DEVID_B 260 | DEVID_D 264 | DEVID_E 266 |
|---|---|---|---|

| Code 280 |
|---|

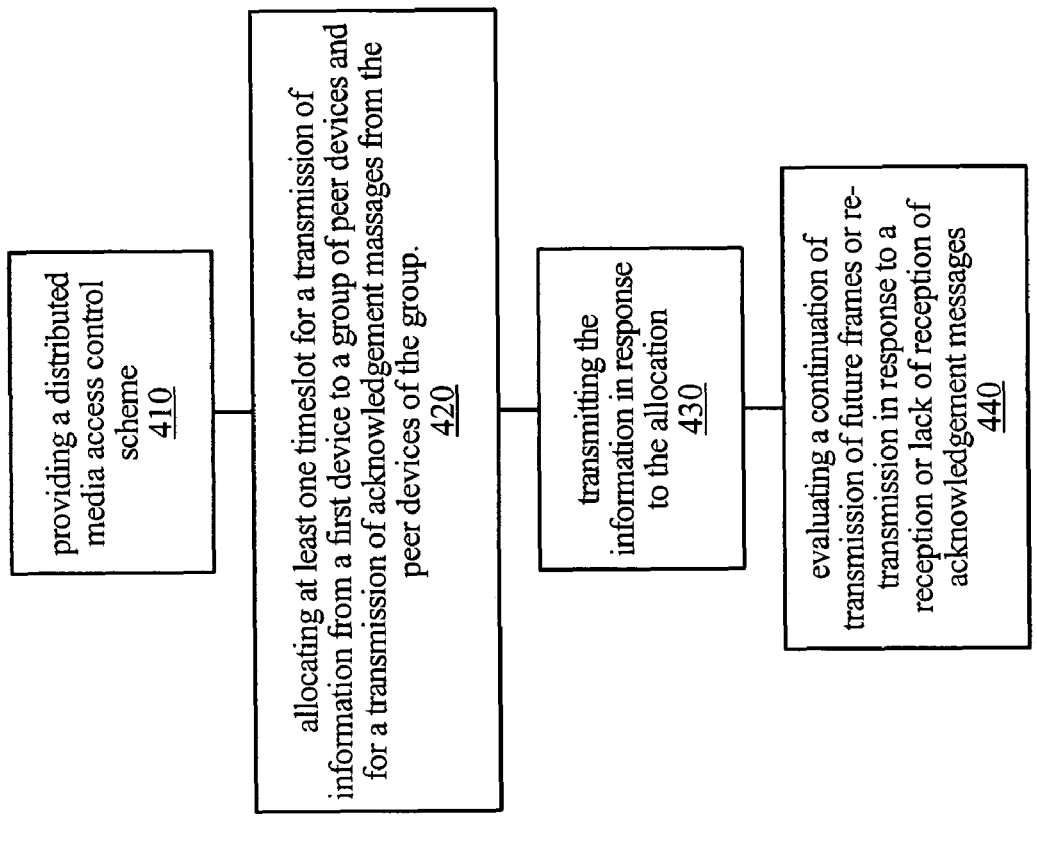

METHOD AND DEVICES FOR MULTICASTING INFORMATION OVER A NETWORK THAT APPLIED A DISTRIBUTED MEDIA ACCESS CONTROL SCHEME

RELATED APPLICATIONS

The present patent application is a continuation application of International Application No. PCT/IL05/000021 filed Jan. 6, 2005, which claims priority benefit from U.S. Provisional Application No. 60/535,436 filed Jan. 8, 2004 and U.S. Provisional Application No. 60/535,621 filed Jan. 8, 2004, the contents of which are incorporated herein by reference.

This application is related to the following applications:
1. METHODS AND DEVICES FOR EXPANDING THE RANGE OF A NETWORK, application Ser. No. 11/043,646, filed Jan. 25, 2005.
2. METHOD AND SYSTEM FOR OPERATING MULTIPLE DEPENDENT NETWORKS, application Ser. No. 11/043,457, filed Jan. 25, 2005.
3. A DEVICE AND METHOD FOR MAPPING INFORMATION STREAMS TO MAC LAYER QUEUES, application Ser. No. 11/043,476, filed Jan. 25, 2005.
4. ULTRA WIDE BAND WIRELESS MEDIUM ACCESS CONTROL METHOD AND A DEVICE FOR APPLYING AN ULTRA WIDE BAND WIRELESS MEDIUM ACCESS CONTROL SCHEME, application Ser. No. 11/043,253, filed Jan. 25, 2005.
5. METHOD AND DEVICE FOR TRANSMISSION AND RECEPTION OVER A DISTRIBUTED MEDIA ACCESS CONTROL NETWORK, application Ser. No. 11/043,279, filed Jan. 25, 2005.

FIELD OF THE INVENTION

The invention relates to multicast transmission and especially to multicast transmission over networks that utilize a distributed media access control scheme.

BACKGROUND OF THE INVENTION

Recent developments in telecommunication and semiconductor technologies facilitate the transfer of growing amounts of information over wireless networks.

Recent developments in telecommunication and semiconductor technologies facilitate the transfer of growing amounts of information over wireless networks.

Short-range ultra wide band wireless networks are being developed in order to allow wireless transmission of vast amounts of information between various devices.

Some of short-range ultra wide band wireless networks are characterized by a distributed architecture in which devices exchange information without being controlled by a central host or a base station.

FIG. 1 is a schematic illustration of two ultra wide band wireless networks (also referred to as personal access networks) 10 and 20, each including multiple devices that wirelessly communicate with each other. First network 10 includes first till fifth devices A-E 11-15 and the second network 20 includes sixth till eighth devices F-I 26-29.

Each of the ultra wide band wireless networks uses time division multiple access (TDMA) techniques in order to allow its devices to share a single channel.

FIG. 2 illustrates a typical TDMA frame 30. TDMA frame 30 includes multiple time-slots, such as beacon slots 14 and media access slots. The media access slots include distributed reservation protocol (DRP) slots 36 and prioritized contention access (PCA) slots 38. PCA slots are also referred to as PCA periods. DRP slots are also referred to as DRP periods. The TDMA frame is also referred to as super frame.

The beacon slots are used to synchronize devices to the TDMA frame 30. A typical beacon frame includes information that identifies the transmitting device. It also may include timing information representative of the start time of the TDMA frame 30.

The DRP slots 36 are coordinated between devices that belong to the same network and allow devices to reserve these slots in advance. During the PCA slots 38 devices that belong to the network compete for access based upon their transmission priority. It is noted that the allocation of media access time slots is dynamic and can change from one TDMA frame to another.

Typically, transmissions from devices during PCA slots are assigned by applying a carrier sense multiple access with collision avoidance (CSMA/CA) scheme. If a device requests to transmit over a wireless medium it has to check if the wireless medium is idle. If the wireless medium is idle, the device has to wait a random backoff period. This random backoff time is selected from a contention window that has a length that is related to the priority of the device. For higher-priority devices the contention window is shorter.

The transmission process is usually quite complex and includes many operations such as but not limited to forward correction encoding, interleaving, modulating and the like. A receiver must reverse the procedures applied by the transmitter.

Various techniques are applied in order to increase the reliability of wireless telecommunications. A first technique includes sending acknowledgement messages to indicate a reception of a certain information frame when performing point-to-point transmission. These acknowledgement messages can be sent per frame or per a group of frames. The former decreases the communication channel utilization but reduces communication error penalty. The acknowledgement transmission techniques (Imm-ACK and B-ACK) are not applied when performing multicast or broadcast transmission over ultra wide band wireless networks.

In some networks that include a central station and various clients or a master station and multiple slave stations various acknowledgement schemes were applied. The following U.S. patent, U.S. patent applications and PCT patent application, all being incorporated herein by reference, provide an example of some prior art methods and systems: U.S. patent application 2001/0051529 of Davies titled "Radio system and apparatus for, and method of, multicast communication"; U.S. Pat. No. 6,122,483 of Lo et al. titled "Method and apparatus for multicast messaging in a public satellite network"; U.S. patent application 2003/0145102 of Keller-Tuberg, titled "Facilitating improved reliability of internet group management protocol through the use of acknowledgment massages"; and PCT patent application WO2004/084488 of Lynch et al, titled "Method and apparatus for reliable multicast".

It is noted that in some applications (such as but not limited to streaming video, sound, and the like) the performance and the user experience deteriorate significantly when the non-acknowledgement schemes are used with nominal channel conditions (~1-8% Packet Error Ratio). Also, using acknowledge schemes in layers above the MAC layer (such as TCP/IP layers) increase significantly the latency and memory requirements, deteriorate the throughput, and in some cases make the application impractical if not impossible from implementation standpoint.

There is a need to increase the reliability of ultra wide band transmission while keeping the throughput high and implementation requirements overhead low, reducing transmission or reception of error penalty.

SUMMARY OF THE INVENTION

A method for multicasting information over a network that utilizes a distributed media access control scheme, the method includes: (i) utilizing a distributed media access control scheme for allocating at least one timeslot for a transmission of information from a first device to a group of peer devices and for a transmission of acknowledgement messages from the peer devices of the group; and (ii) transmitting the information in response to the allocation.

A device that includes (i) a medium access controller adapted to participate in a distributed media access control scheme that allocates at least one timeslot for a transmission of information from the device to a group of peer devices and for a transmission of acknowledgement messages from the peer devices of the group; and (ii) transmission circuitry adapted to transmit the information in response to the allocation.

A computer readable medium having code embodied therein for causing an electronic device to perform the stages of: utilizing a distributed media access control scheme for allocating at least one timeslot for a transmission of information from a first device to a group of peer devices and for a transmission of acknowledgement messages from the peer devices of the group; and transmitting the information in response to the allocation.

BRIEF DESCRIPTION OF THE DRAWINGS

The present invention will be understood and appreciated more fully from the following detailed description taken in conjunction with the drawings in which:

FIGS. 3*a*-3*d* illustrate an information frame as well as various portions of information frame, according to various embodiments of the invention;

FIG. 7 is a flow chart of a method for multicasting information over an ultra wide band wireless medium, according to an embodiment of the invention.

DETAILED DESCRIPTION OF THE DRAWINGS

The following description related to wireless ultra wide band networks that utilize a distributed media access control scheme. In these networks there is no central media access controller, but rather various devices of the network participate in determining how to share a common wireless medium. It is noted that according to various embodiments of the invention the disclosed methods and devices can be applied in networks that utilize a distributed media access control scheme but differ from ultra wide band wireless networks.

Various operations such as transmissions utilize the distributed media access control scheme in the sense that the access to a shared medium is governed by a distributed media access control scheme.

It is assumed, for simplicity of explanation, that the first device A 11 multicasts to other members B-E 12-15 of the first network. It is noted that other devices can also multicast, and that the multicasting can be applied to fewer members of the first network 20.

FIGS. 3*a*-3*d* illustrate information frame 200 as well as various portions of information frame 200, according to various embodiments of the invention.

The information frame 200 includes acknowledgment message information 160. This acknowledgement message information 160 can be a part of the payload of information frame 200 or a part of its header, or may be pre-negotiated.

According to another embodiment of the invention the order of acknowledgement message transmissions can be pre-determined such that there is no need in transmitting the acknowledgement message information 160. For example, if the devices agree (or are pre-programmed or otherwise configures) to transmit the acknowledgement messages in response to the order of transmission of the devices beacon frames than there is no need in transmitting information 160.

FIGS. 3*a*-3*d* illustrate acknowledgment message information 160 that is part of the information frame payload. The acknowledgment message information 160 can merely specify the order of acknowledge message transmission but can also define the timing of the transmission.

Figure 1:
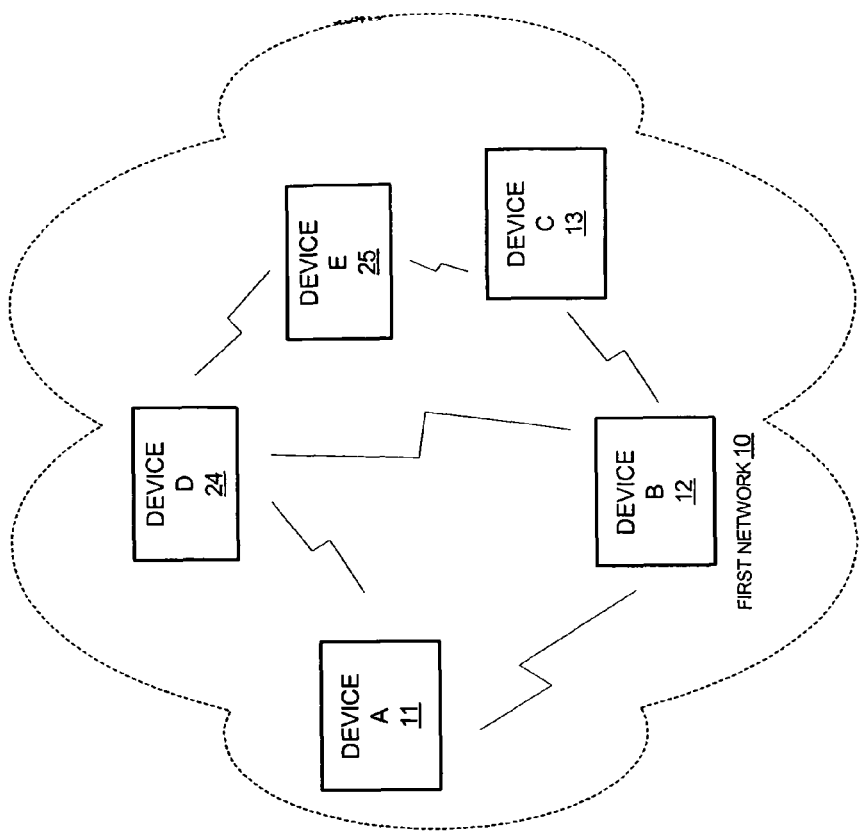
FIG. 1 is a schematic illustration of two networks (also referred to as personal access networks), each including multiple devices that wirelessly communicate with each other.
Figure 1:
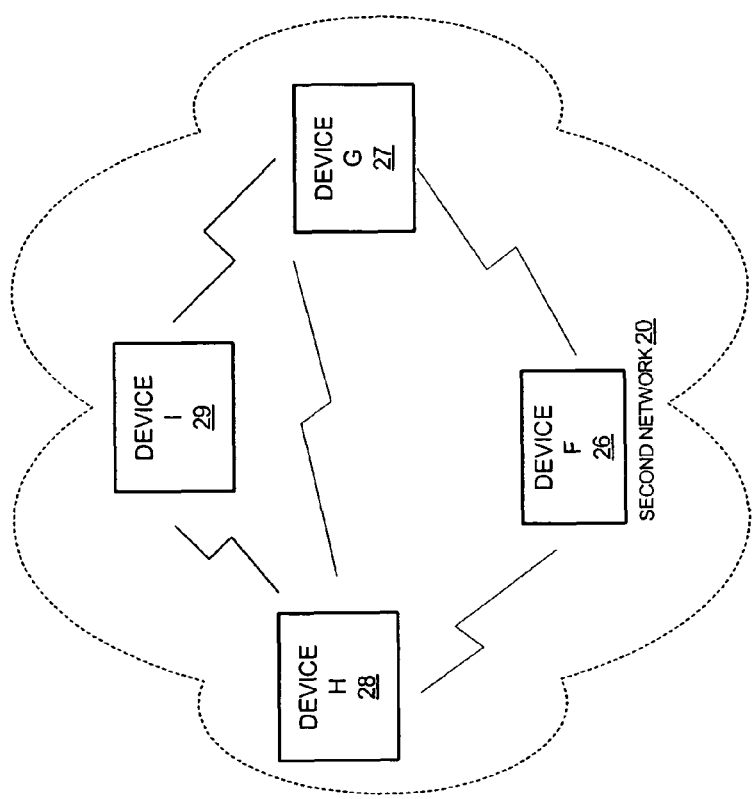
Figure 2:
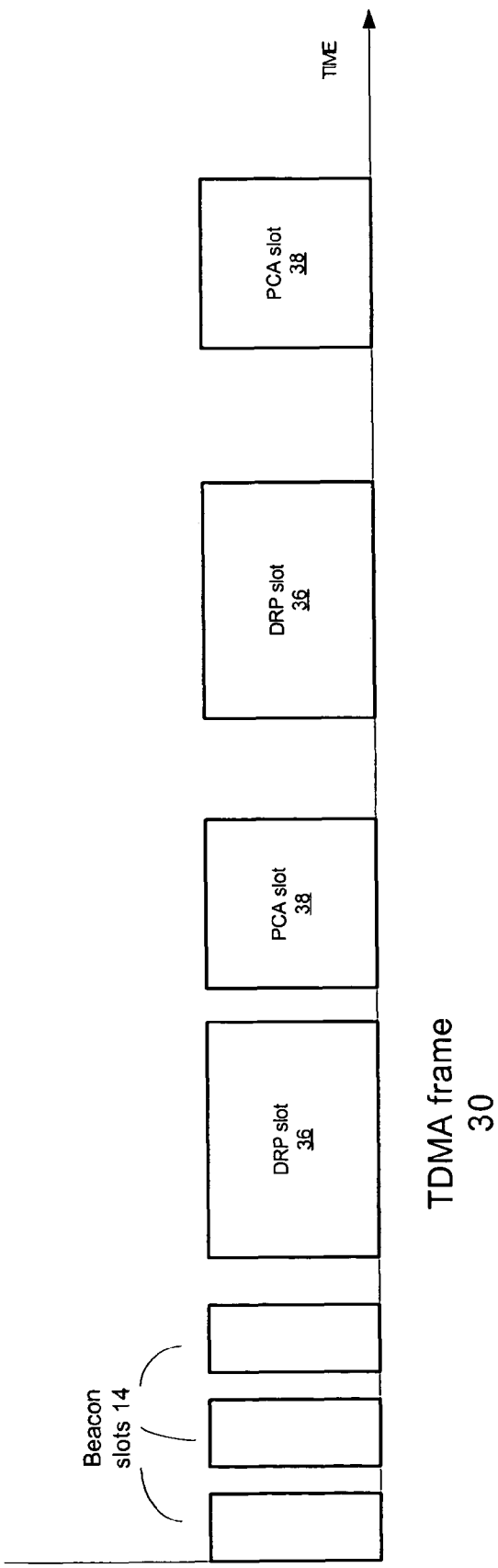
FIG. 2 illustrates a typical TDMA frame.
Figure 3A:
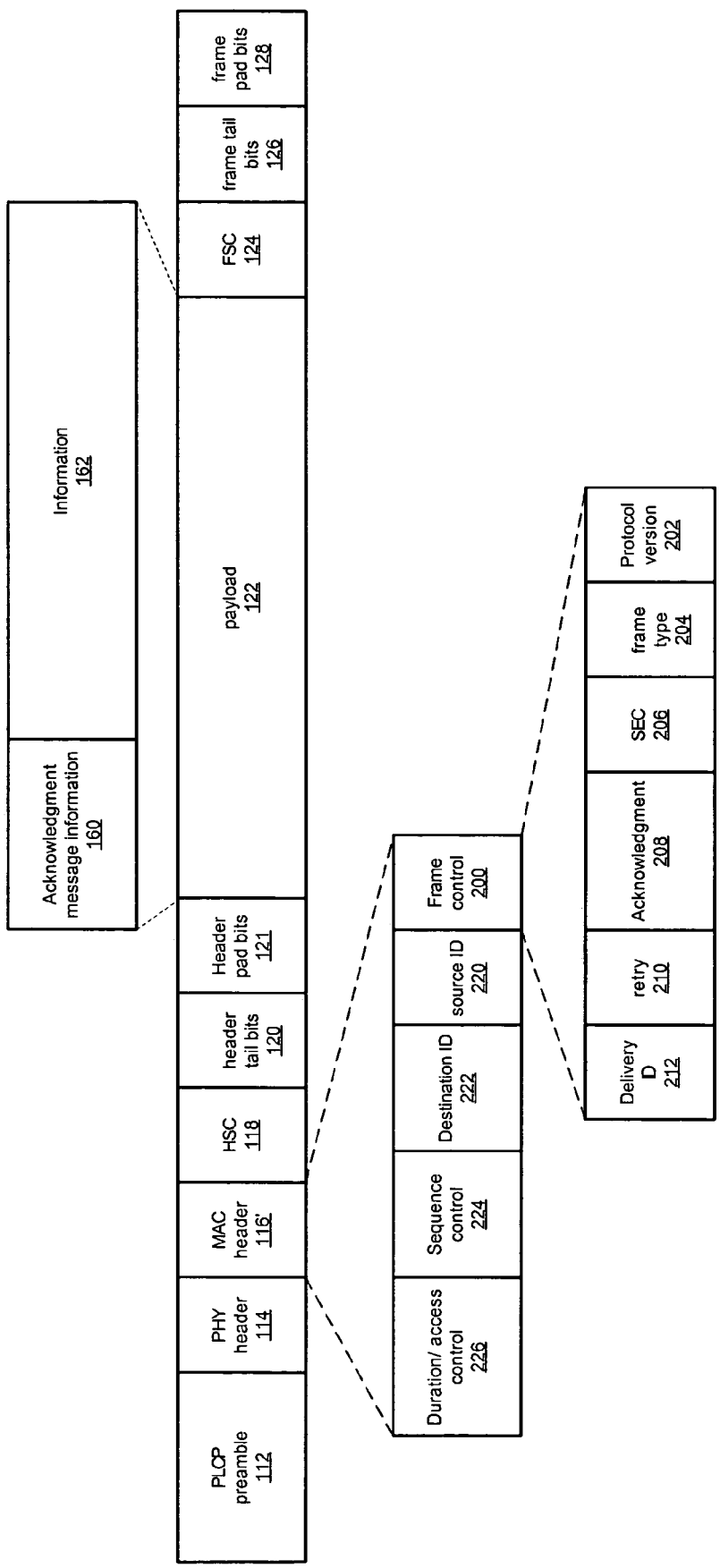

FIG. 3*a* illustrates an information frame 200 according to an embodiment of the invention. The information frame 200 includes a physical layer convergence procedure (PLCP) preamble 112, a PHY layer header 114, a MAC layer header 116, a header check sequence field (HCS) 118, header tail bits 120, header pad bits 121, payload 122, a frame check sequence field (FCS) 124, frame tail bits 126 and pad bits 128.

The payload 122 includes acknowledgment message information 160 and information 162. The MAC layer header 116 includes information that identifies information frame 122 as an acknowledge based. The destination address of this frame indicates multicast transmission. It is noted that some of the acknowledgment message information 160 can also be includes within the MAC layer header 116 or only within said header.

The information frame 200 includes MAC layer fields such as fields 116, 118, and 124. Information frame 200 also includes various PHY layer fields, such as fields 112, 114, 120, 121, 126 and 128. The payload 122 usually includes one or more MAC layer frames or frames of a upper communication protocol layer, such as an application layer.

The PLCP preamble 112 includes a packet and frame synchronization sequences that are followed by a channel estimation sequence. The PLCP preamble assists the receiver, among other things, to estimate the properties of the wireless medium. MBOA proposes two possible PLCP preambles—a short PLCP preamble and a long PLCP preamble. The long PLCP preamble is used at low bit rates. At high bit rates a first frame includes the long PLCP preamble while the remaining frames may include the short PLCP preamble.

The PHY layer header 114 includes information about the type of modulation, the coding rate and the spreading factor used during the transmission of the information, the length of the frame payload and scrambling data information.

The MAC layer header 116 includes a frame control field 201, source and destination identification fields 220 and 222, sequence control fields 224 and duration/access method fields 226. The frame control field 220 includes a protocol version field 202, a frame type field 204 (indicates if a frame is a beacon frame, control frame, command frame, data frame and the like), a SEC field 206 (indicated if the frame is encrypted), an acknowledge policy field 208 (no acknowledge, immediate acknowledge, burst acknowledge or burst acknowledge request), a retry field 210 (indicates if the frame is re-transmitted), and delivery ID field 212. An immediate acknowledge requires to send an acknowledge frame response after the recipient of the information frame. The burst acknowledge indicates to store received frames and the burst acknowledge request indicates to send an acknowledgment message with information about success/failure of reception of individual frames in last bursts.

The destination identification field 220 indicates the identity of intended receivers and may indicate that the transmission is multicast. In case of broadcast the identity of recipients is not necessarily known in advance.

According to an embodiment of the invention the acknowledgment message information 160 can be a part of a data frame, as illustrated in FIG. 3a, or may be a part of a command frame.

The header tail bits 120 as well as the frame tail bits 126 are set to zero, thus allowing a convolutional encoder within the receiver to return to a "zero state" and improve its error probability. The header tail bits 120 (the frame tail bits 126) are followed by header pad bits 121 (frame pad bits 128) in order to align the information stream on an OFDM interleaver boundaries.

The payload is usually between one byte and 4096 bytes long. When a transmission or reception error occurs the whole frame is re-transmitted.

FIG. 3b illustrates acknowledgment message information 160 that includes both order and timing information. The transmitter transmits the timing of acknowledgement messages transmission from the multicast receivers. Each of the devices of the first network 20 is represented by its DEVID (DEVID_C 262, DEVID_B 260, DEVID_D 264 and DEVID_E 266) and a corresponding acknowledgement messages transmission time TAM 1-TAM 4 270-276. The acknowledgment message information can represent an offset from the beginning of the last multicast information frame, from the end of the last multicast information frame, or from a beginning of a TDMA super frame.

FIG. 3c-3d illustrate various formats of acknowledgment messages order information included within acknowledgment message information 160. The order of the acknowledgment messages can be represented by a list of devices, sorted according to their acknowledgment messages transmission order: DEVID_C 262, DEVID_B 260, DEVID_D 264 and DEVID_E 266. FIG. 3d illustrates a more efficient manner for transmitting the order of acknowledgment messages. Assuming that there are $2^K$ possible orders than K bits (denoted code 280) represent the selected order. In such a case the amount of devices that participate in the scheme should be transmitted.

The transmission of only order information without exact timing is based upon the ability of the receiving devices to determine the end of the transmission Once a device receives an information frame that is multicast and requires acknowledgments it will search for acknowledgment message information 160 within the information packet end of transmission.

Conveniently, the device is a part of an ultra wideband wireless network and has a communication protocol stack that includes at least a PHY layer and a MAC layer. The MAC layer of such devices controls the access to ultra wide band wireless medium and is referred to ultra wide band wireless medium access control.

Examples of devices that have a PHY layer are illustrated in the following U.S. patent applications, all being incorporated herein by reference: U.S. patent application Ser. No. 10/389789 filed on Mar. 10 2003 and U.S. patent application Ser. No. 10/603,372 filed on Jun. 25 2003.

The receiver can include various components that are arranged in multiple layers. A first configuration includes a frame convergence sub-layer, a MAC layer, a PHY layer as well as MAC SAP, PHY SAP, frame convergence sub-layer SAP and a device management entity can also be utilized. An exemplary configuration is described at FIGS. 4a and 4b.

Wisair Inc. of Tel Aviv Israel manufactures a chip set that includes a Radio Frequency PHY layer chip and a Base-Band PHY layer chip. These chips can be connected in one end to a RF antenna and on the other hand can be connected to or may include a MAC layer circuitry.

Figure 4A:
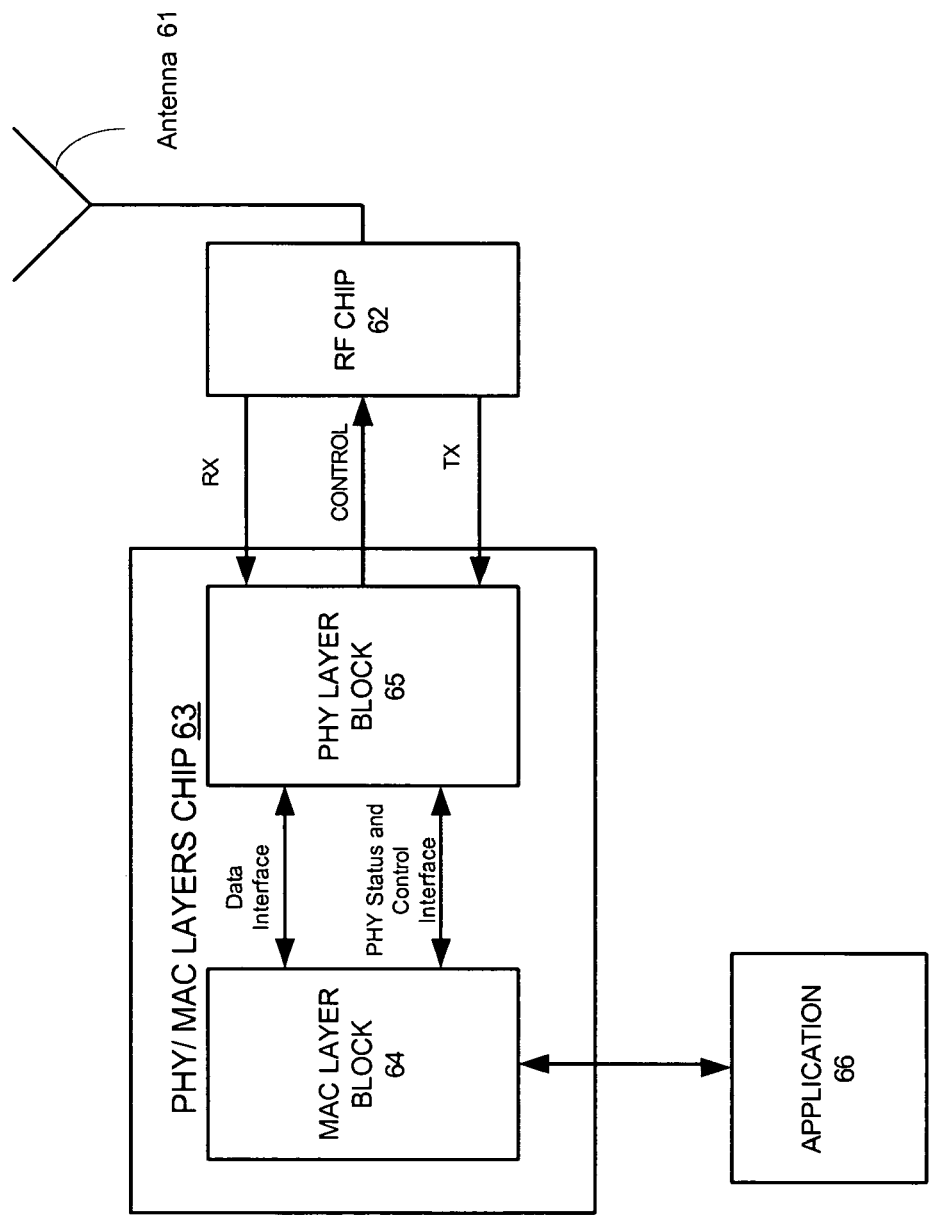
FIGS. 4*a*-4*b* illustrate a device capable of wireless transmission, and some of its components, according to an embodiment of the invention.

FIG. 4a illustrates a device 60 that is capable of wireless transmission, according to an embodiment of the invention.

Conveniently, device 60 supports a multi-layer communication protocol stack that includes a PHY layer and a MAC layer. MAC layer hardware and/or software components form an ultra wide band wireless medium access controller, that is adapted to participate in a distributed media access control scheme that allocates at least one timeslot for a transmission of information from a first device to a group of peer devices and for a transmission of acknowledgement messages from the peer devices of the group. PHY layer hardware and/or software components form a transmission circuitry adapted to transmit the information in response to the allocation.

Device 60 includes antenna 61 that is connected to a RF chip 62. RF chip 62 is connected to a MAC/PHY layers chip 63 that includes a PHY layer block 63 and a MAC layer block 64. The MAC/PHY layers chip 63 is connected to an application entity 66 that provides it with information to be eventually transmitted (TX) and also provides the application 66 with information received (RX) by antenna 61 and processed by PHY and MAC layers blocks 68 and 69 of FIG. 4b.

Typically, the MAC layer block 64 controls the PHY layer block using a PHY status and control interface. The MAC and PHY layers exchange information (denoted TX and RX) using PHY-MAC interface 90. The RF chip 62 provides to the PHY layer block 63 received information that is conveniently down-converted to base band frequency. The RF chip 62 receives from the PHY layer block 63 information to be transmitted as well as RF control signals. The application 66 is connected to the MAC/PHY layers chip 63 by a high speed I/O interface.

Figure 4B:
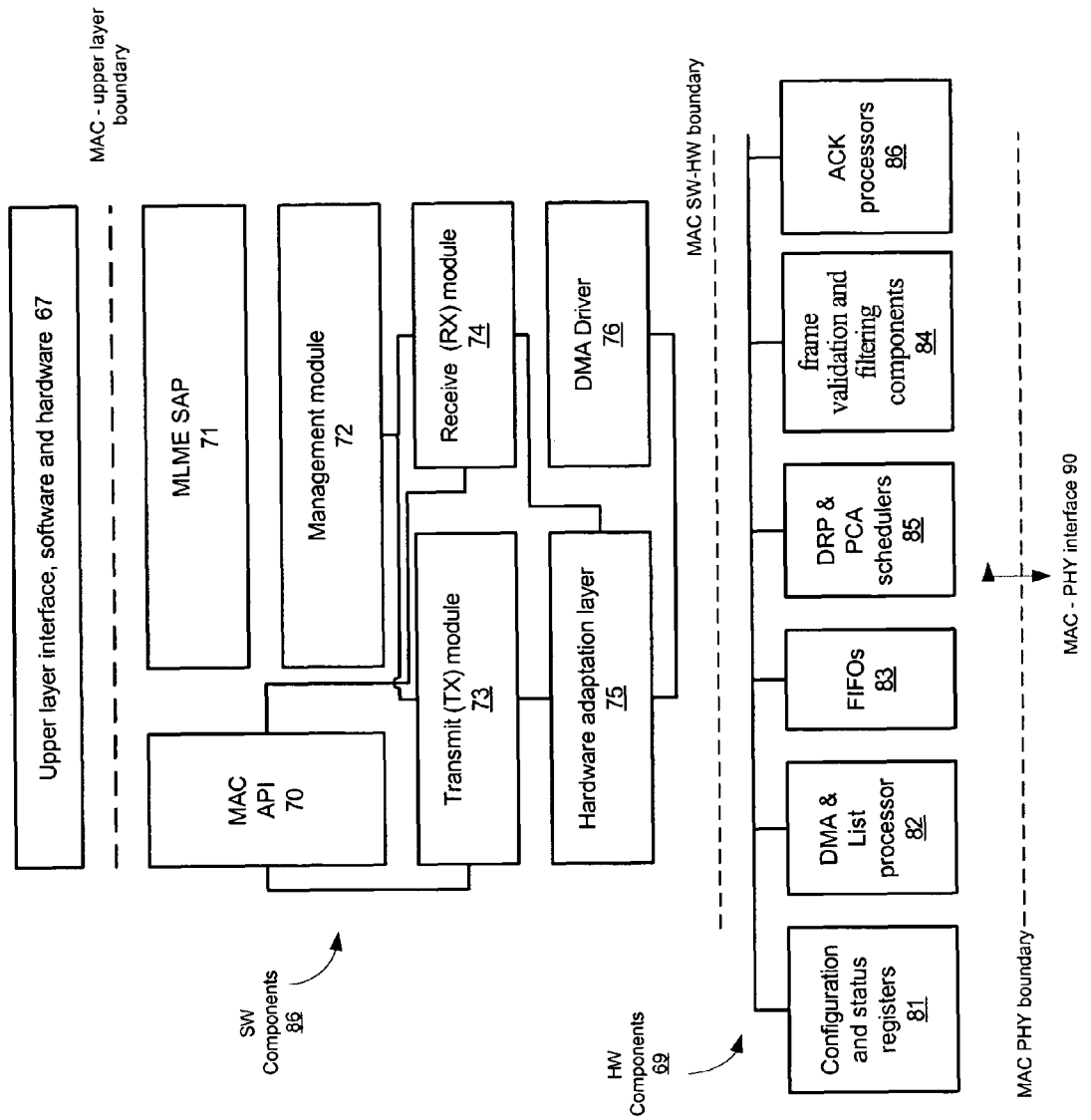

FIG. 4b illustrates various hardware and software components of the MAC/PHY layers chip 63, according to an embodiment of the invention.

The Upper Layer IF block 64 of the MAC/PHY layers chip 63 includes hardware components (collectively denoted 69) and software components (collectively denoted 68). These components include interfaces to the PHY layer (MAC-PHY interface 90) and to the application (or higher layer components).

The hardware components 69 includes configuration and status registers 81, Direct Memory Access controller and list processor 82, First In First Out (FIFO) stacks 83 and frame validation and filtering components 84, DRP and PCA slots schedulers 85, ACK processors 86, and MAC-PHY internal interface 87.

The software components 68 includes a management module 72, transmit module 73, receive module 74, hardware adaptation layer 75, DMA drivers 76, MAC layer management entity (MLME) service access point (SAP) 71, MACS API 70 and the like.

These software and hardware components are capable of performing various operations and provide various services such as: providing an interface to various layers, filtering and routing of specific application packets sent to MAC data queues or provided by these queues, performing information and/or frame processing, and the like.

The routing can be responsive to various parameters such as the destinations of the packets, the Quality of Service characteristics associated with the packets, and the like.

The processing of information along a transmission path may include: forming the MAC packet itself, including MAC header formation, aggregation of packets into a bigger PHY PDU for better efficiency, fragmentation of packets for better error rate performance, PHY rate adaptation, implementation of acknowledgements policies, and the like.

The processing of information along a reception path may include de-aggregation and/or de-fragmentation of incoming packets, implementation of acknowledgment policies and the like.

The hardware components are capable of transferring data between MAC software queues and MAC hardware (both TX and RX), scheduling of beacons slots, scheduling of DRP and PCA access slots, validation and filtering (according to destination address) of incoming frames, encryption/decryption operations, low-level acknowledgement processing (both in the TX path and in the RX path), Device 60 can be a simple device or even a complex device such as but not limited to a multimedia server that is adapted to transmit information frames of different types to multiple devices. It can, for example transmit Streaming data, like voice, Video, Game applications, etc.) data files during DRP slots, and while PCA slots transmits video over IP frames, download MP3 files, download MPEG-2 files, and stream or download MPEG-4 streams.

Figure 5:
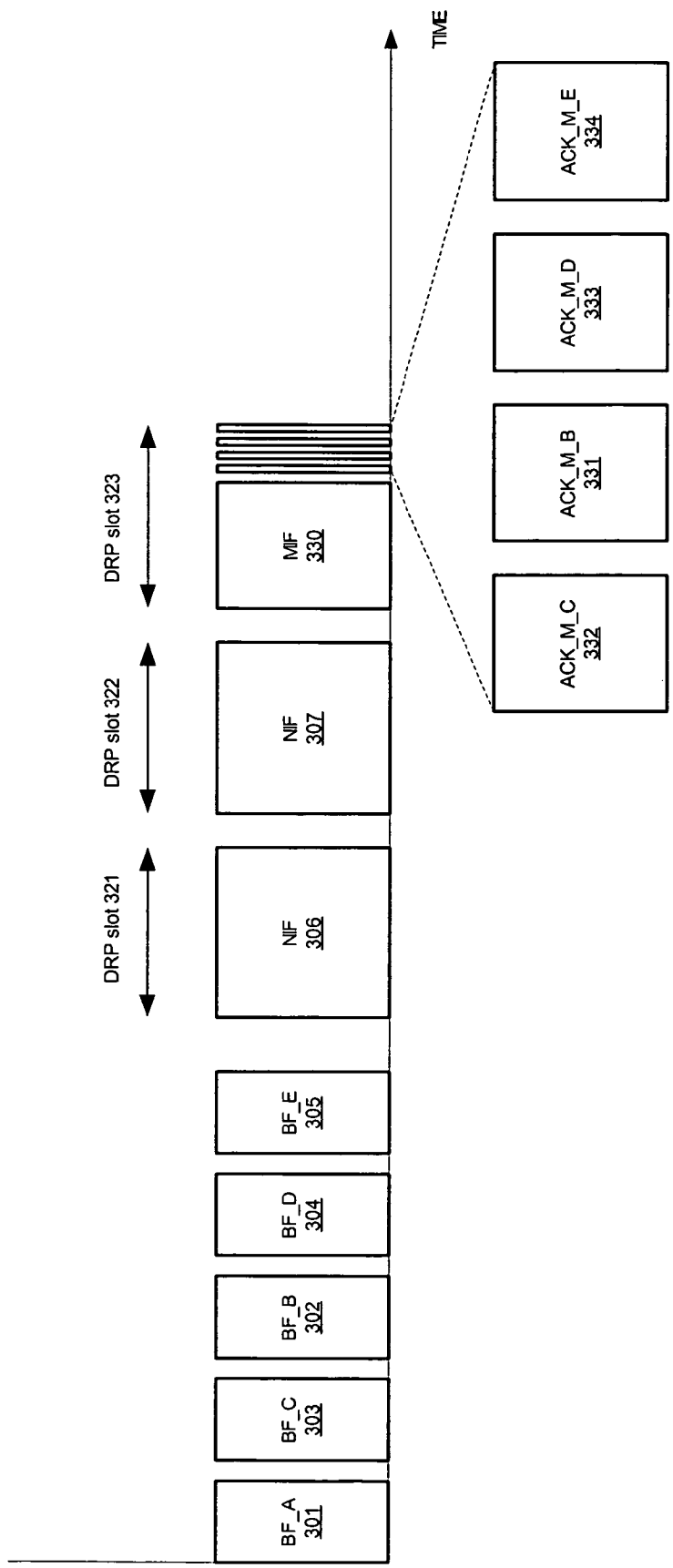
FIGS. 5-6 are illustrate timing diagrams of a multicast transmission of an information frame and a transmission of acknowledgment messages, according to various embodiments of the invention.

FIG. 5 is an exemplary timing diagram 300 illustrating a multicast transmission of an information frame and a transmission of acknowledgment messages.

The timing diagram starts by a transmission of beacon frames (BF) 301, 303, 302, 304 and 305 during beacons period 320, from devices 11, 13, 12, 14 and 15 of first network 20. These beacon frames are followed by a point-to-point transmission, during two DRP timeslots 321 and 322, of two information frames 306 and 307. It is noted that although this Figures illustrates a single frame per DRP slot this is not necessarily so. DRP slots are not necessarily limited to a single frame transfer. They may include several frames, or, on other hand, a single frame may span a few DRP slots. These two information frames are followed by a multicast timeslot 323 during which a multicast information frame (MIF) 330 is transmitted from first device A 11 to devices B-E. During the multicast time slot 323 devices B-E transmit acknowledgment messages (ACK_M_B 332 from device B 12, ACK_M_C 331 from device C, ACK_M_D 333 from device D 14 and ACK_M_E 334 from device E 15) that are supposed to be received by first device A 11.

Figure 6:
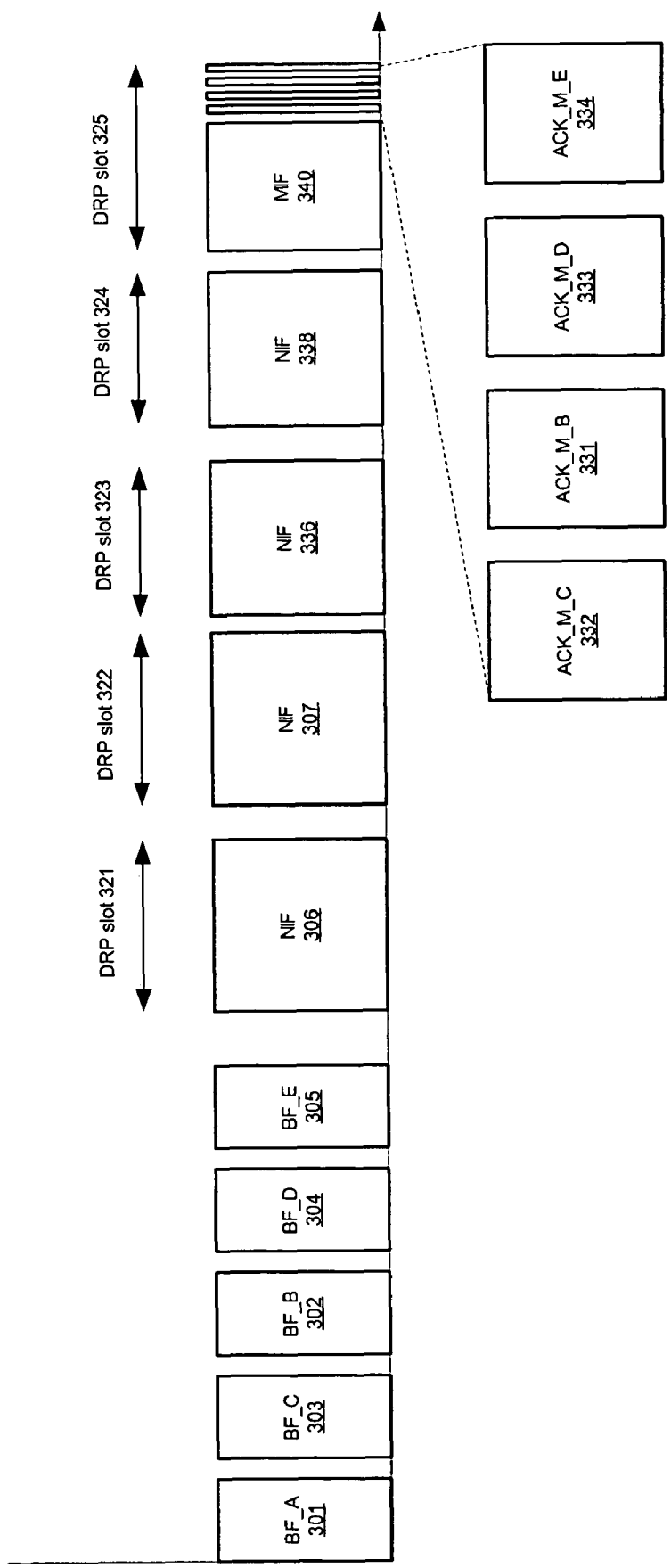

FIG. 6 is an exemplary timing diagram that illustrates a multicast transmission of information during multiple time slots. The exemplary timing diagram illustrates a transmission of multiple multicast information frames MIF 336-340 during three DRP timeslots 323-325 wherein the last timeslot 325 is also allocated for the transmission of acknowledgment messages. It is noted that the DRP slots as well as the PCA slots can be used for transmitting more that a single information frame or even only a frame portion. This scenario can be used when a fragmented information frame is transmitted during multiple timeslots and is also applicable when applying a burst acknowledgement scheme.

FIG. 7 is a flow chart of method 400 for multicasting information over an ultra wide band wireless medium, according to an embodiment of the invention.

Method 400 starts by optional stage 410 of providing a distributed media access control scheme. Conveniently, stage 410 includes scheduling a transmission and a reception of beacon frames, allocating PCA slots and DRP slots and the like. Conveniently, the DRP slots are coordinated between devices that belong to the same network and allow devices to reserve these slots in advance. During the PCA slots devices that belong to the network compete for access based upon their transmission priority. It is noted that the allocation of media access time slots is dynamic and may change from one TDMA frame to another.

Stage 410 can be repeated during the execution of the other stages of method 400. Thus, various slots can be allocated before and after a multicast transmission is requested and scheduled. Typically, the ultra wide band wireless network does not include a central media access controller and the various peer devices that form this network exchange signals in order to allocate timeslots (grant access to the wireless medium).

According to various embodiments of the invention method 400 can be applied by other networks, such as but not limited to networks that are not ultra wide band networks. These networks can apply a distributed media access control scheme.

Conveniently, stage 410 includes determining an order of beacon frames that are transmitted by the peer devices. Typically, before a device joins a network is tries to detect existing beacon frames and if received it transmits its own beacon frame such as not to disrupt the existing beacon frames.

According to an embodiment of the invention timing or ordering information is sent only when a change occurs between a previous multicast transmission and a current multicast transmission.

According to an embodiment of the invention the temporary loss of one or more beacon frames, during one or more TDMA frame shall not alter the order of transmission of acknowledgment messages.

According to yet another embodiment of the invention the method is adapted to manage transmission of information bursts. Typically, the transmission of transmission bursts is coordinated between the transmitter and the intended receivers. Said coordination is required in order to avoid receiver overflows. Thus, before transmitting an information burst to a certain receiver the transmitter has to know the receiving capabilities of the intended receiver.

The capabilities can include the amount of frames that the receiver can receive, the overall size of information frames that can be received by the receiver and can include the reception rate of the receiver. This rate can be influenced by the processing and buffering capabilities of the receiver.

Usually the transmitter will select a transmission that can be properly received by all the receivers, thus the transmission will be responsive to the slowest or least buffering receiver.

Stage 410 is followed by stage 420 of allocating at least one timeslot for a transmission of information from a first device to a group of peer devices and for a transmission of acknowledgement messages from the peer devices of the group; and transmitting the information in response to the allocation.

Conveniently, a transmission order of acknowledgement messages is responsive to the transmission order of beacon frames. According to an embodiment of the invention the transmission order of acknowledgement messages is substantially equal to the transmission order of beacon frames. In such a case there is no need in transmitting ordering information.

Conveniently, a first acknowledgment message and an end of information burst or frame are scheduled to be transmitted at a same timeslot or contiguous MAS slots belonging to the same DRP reservation or contiguous PCA MAS slots".

Conveniently, stage 420 includes allocating the one or more timeslots such that a delay between a scheduled transmission of a beginning of the information and a scheduled transmission of a last acknowledgement message is responsive to the capabilities, such as buffering capabilities, of the first device. The transmitter has to be capable of re-transmitting information frames that were not received by one or more intended receivers. Thus, the transmitter has to buffer transmitted information frames during at least the mentioned above period.

According to an embodiment of the invention stage 420 further includes allocating a transmission of acknowledgment message information. Conveniently, the acknowledgment message information includes acknowledgment messages order information.

Conveniently, the order information includes information for selecting between a set of predefined options. The order of acknowledgment messages transmission can be selected between a set of predefined functions.

It is noted that the acknowledgement message information can be embodied in a certain information element (IE) within a beacon of the source of the source of multicast transmission, specifying the sequence of the ACK frames to be transmitted. In case a beacon is missed, the order of transmission of acknowledgement messages is conserved for a predefined amount of beacon frames (denoted MaxLostBeacons). Notification about change in ACK frames sequence can be transmitted at least MaxLostBeacons before an actual change in the order of transmission occurs.

Assuming, for example that there are $2^K$ possible relationships between the beacon transmission order and the transmission order of the acknowledgment messages then the selected relationship can be represented by K bits.

According to another embodiment of the invention the various peer devices can agree on a mapping between various acknowledgement transmission orders and order information codes.

Conveniently, the acknowledgment message information includes an identity of each peer device of the group and a time for transmitting its corresponding acknowledgement message.

Stage 420 is followed by stage 430 of transmitting the information in response to the allocation. The transmission is followed by a reception of acknowledgement messages.

Stage 430 can be followed by stage 420. Conveniently, stage 430 can be followed of stage 440 of evaluating a continuation of transmission of future frames or retransmission in response of a reception or lack of reception of acknowledgement messages. Stage 440 may include determining whether to re-transmit an information frame, and if so—whether to multicast it or transmit it using a point-to-point scheme it. It can also include altering acknowledgement schemes (for example—replacing burst acknowledgement to immediate acknowledgement, replacing immediate acknowledgement to burst acknowledgement, increasing or decreasing a size of a burst that is followed by an acknowledgement request), altering framing (by aggregation or fragmentation), changing the identity of recipients, and the like. It is noted that a change in the identity of recipients requires to update acknowledge messages timing information.

It is noted that method 400 facilitates a transmission of multiple information frames during multiple time frames. The identity of the devices that belong to the group can change over time, and stage 420 is responsive to said change. Thus, the amount of acknowledgement messages and the identity of intended acknowledging devices may change.

Conveniently, an allocation of the one or more time slots for a transmission from the first device starts by a request to transmit said information and also to allow the transmission of acknowledgement messages.

According to an embodiment of the invention the requesting device announces which peer devices are to receive the multicast information. Conveniently, each device can respond by accepting the request and can also transmit his reception capabilities, so that the first device determines the amount, rate and/or timing of the transmission. These capabilities usually include buffering capacity, reception rate and the like. In some cases the buffering capability is limited by the amount of frames that can be received, by the overall size of received information and the like.

The identity of the intended recipients as well as a need to re-transmit one or more information frames, either in a multicast manner or in a point-to-point manner can be responsive to various parameters including the reception or lack of reception of acknowledgment messages.

Conveniently, if the information is multicast during a DRP timeslot then that timeslot is also utilized for receiving acknowledgment messages from the intended recipients of the information. In cases where the information is transmitted during multiple time slots then the last timeslot can be allocated for the transmission of the acknowledgment messages.

Those of skill in the art will appreciate that the method can be easily modified to cases where the information is fragmented to multiple fragments and the acknowledgement messages should be sent after a transmission of at least one of said fragments.

According to other embodiments of the invention the acknowledgement messages can be sent during different timeslots. This can happen if a single timeslot is not long enough to encompass the transmission of all the expected acknowledgment messages. This can also happen if the method determines to transmit only some acknowledgment messages at a time.

Conveniently, if the information is scheduled be transmitted during one or more PCA timeslots then a transmission of acknowledgment messages from the group members are scheduled to be transmitted during a PCA timeslot in which at least an end of the information is scheduled to be transmitted.

According to an embodiment of the invention, the scheduling of a transmission of acknowledgment messages is responsive to a priority of the peer members. The priority can determine the order of transmission or can also be used a random or semi-random allocation schemes. In the latter, an acknowledgement message of a certain peer device is scheduled to be transmitted within a transmission window that is defined in response to the priority of the peer device.

According to an embodiment of the invention the transmitter can determine whether to re-transmit an information frame that was not acknowledged by a certain device in response to various parameters including the presence or absence of previous acknowledgments, the relevancy of the information frame and the like. The relevancy usually is reflected by an expiration period (also known as time of live) that can be associated with the information frame. The transmitter can re-transmit information frames in a multicast or point-to-point manner.

It will be apparent to those skilled in the art that the disclosed subject matter may be modified in numerous ways and may assume many embodiments other then the preferred form specifically set out and described above. For example, the amount of access units can differ from the amount of queues, the amount of queues and the amount of transmission priorities can vary. It is noted that each of the mentioned above circuitries can be applied by hardware, software, middleware or a combination of the above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

We claim:

1. A method for multicasting information from a first device of a network and a group of peer devices of the network, the method comprises:
   utilizing a distributed media access control scheme for allocating, by coordinating between the first device and the group of peer devices, at least one timeslot for a transmission of information from the first device to the group of peer devices to provide at least one time slot allocated for the transmission of the information; and allocating at least one timeslot for a transmission of acknowledgement messages, from each of the peer devices of the group, indicative of a reception of the information from each of the peer devices of the group to provide at least one time slot allocated for the transmission of the acknowledgement messages; and
   multicasting the information during the at least one time slot allocated for the transmission of the information;
   wherein in the network there is no central media access controller;
   wherein a first time slot out of the at least one time slot allocated for the transmission of information does not follow a first time slot out of the at least one time slot allocated for the transmission of the acknowledgement messages;
   wherein the utilizing of the distributed media access control scheme for allocating, by coordinating comprises:
      requesting, by the first device and from the peer devices of the group, to transmit the information and to allow the transmission of acknowledgement messages from the peer devices of the group during at least one distributed reservation protocol (DRP) slot of a time division multiple access (TDMA) frame; and
      accepting, by peer devices of the group, the request.

2. The method of claim 1, wherein the allocating of the at least one timeslot for a transmission of acknowledgement messages introduces a delay between a scheduled transmission of a beginning of the information and a scheduled transmission of a last acknowledgement message is responsive to capabilities of the first device.

3. The method of claim 2 wherein the acknowledgment message information comprises acknowledgment messages order information.

4. The method of claim 3 whereas the order information comprises information for selecting between predefined ordering possibilities of a transmission of acknowledgement messages from the peer devices of the group.

5. The method of claim 3 wherein the acknowledgment message information comprises an identity of peer devices of the group and timing information for transmitting acknowledgement messages.

6. The method of claim 1 further comprises updating an identity of peer members that belong to the group in response to a reception of acknowledgement messages or an absence of reception of respective acknowledgment messages.

7. The method of claim 1 wherein a transmission of acknowledgment messages is responsive to a priority of the peer members.

8. The method of claim 1 wherein the multicasting of information is over an ultra wide band wireless medium.

9. The method of claim 1, wherein a transmission order of acknowledgement messages is responsive to a transmission order of beacon frames.

10. The method of claim 9, wherein the allocating of the at least one timeslot for the transmission of acknowledgement messages comprises maintaining an order of transmission of acknowledgement messages after temporary losses of at least one beacon frames during at least one time division multiple access frame.

11. The method of claim 1, further comprising coordinating transmission of transmission bursts between the first device and the group of peer devices.

12. The method of claim 1, wherein the utilizing of the distributed media access control scheme comprises participation of multiple devices of the network in determining an allocation of the at least one timeslot for the transmission of information from the first device to the group of peer devices and of the at least one timeslot for the transmission of acknowledgement messages indicative of the reception of the information from the peer devices of the group.

13. A device that belongs to a network that further comprises a group of peer members, the device comprises:
   a medium access controller adapted to participate in a distributed media access control scheme that allocates at least one timeslot for a transmission of information from the device to a group of peer devices of the network to provide at least one time slot allocated for the transmission of the information; and allocates a transmission of acknowledgement messages, from each of the peer devices of the group, indicative of a reception of the information from each of the peer devices of the group to provide at least one time slot allocated for the transmission of the acknowledgement messages, wherein the distributed media access control scheme allocates the at least one timeslot for the transmission of information from the device to the group of peer devices by coordinating between the first device and the group of peer devices; and
   transmission circuitry adapted to multicast the information during the at least one time slot allocated for the transmission of the information;
   wherein in the network there is no central media access controller,
   wherein a first time slot out of the at least one time slot allocated for the transmission of information does not follow a first time slot out of the at least one time slot allocated for the transmission of the acknowledgement messages;
   wherein the device is arranged to participate in the distributed media access control scheme by:
      requesting, by the first device and from the peer devices of the group, to transmit the information and to allow the transmission of acknowledgement messages from the peer devices of the group during at least one distributed reservation protocol (DRP) slot of a time division multiple access (TDMA) frame; and accepting, by peer devices of the group, the request.

14. The device of claim 13 further adapted to allocate of at least one timeslot for a transmission of acknowledgement messages introduces a delay between a scheduled transmission of a beginning of the information and a scheduled transmission of a last acknowledgement message is responsive to capabilities of the device.

15. The device of claim 14 wherein the acknowledgment message information comprises acknowledgment messages order information.

16. The device of claim 15 whereas the order information comprises information for selecting between a predefined ordering possibilities of a transmission of acknowledgement messages from the peer devices of the group.

17. The device of claim 15 wherein the acknowledgment message information comprises an identity of peer devices of the group and timing information for transmitting acknowledgement messages.

18. The device of claim 15 further adapted to update an identity of peer members that belong to the group in response to a reception of acknowledgement messages or an absence of reception of respective acknowledgment messages.

19. The device of claim 13 further adapted to transmit over an ultra wide band wireless medium.

20. The device of claim 13, wherein the media access control scheme that allocates the at least one time slot for the transmission of acknowledgement messages further comprises maintaining an order of transmission of acknowledgement messages after temporary losses of at least one beacon frames during at least one time division multiple access frame.

21. The device of claim 13, wherein the medium access controller is further adapted to participate in coordination of transmission of transmission bursts between the device and the group of peer devices.

22. The device of claim 13, wherein a transmission order of acknowledgement messages is responsive to a transmission order of beacon frames.

23. A non-transient computer readable medium having code embodied therein for causing a first device to perform the stages of:

utilizing a distributed media access control scheme for allocating, by coordinating between the first device of a network in which there is no central media access controller and a group of peer devices of the network, at least one timeslot for a transmission of information from the first device to the group of peer devices to provide at least one time slot allocated for the transmission of the information; and allocating at least one timeslot for a transmission of acknowledgement messages, from each of the peer devices of the group, indicative of a reception of the information from each of the peer devices of the group to provide at least one time slot allocated for the transmission of the acknowledgement messages; and multicasting the information during the at least one time slot allocated for the transmission of the information;

wherein a first time slot out of the at least one time slot allocated for the transmission of information does not follow a first time slot out of the at least one time slot allocated for the transmission of the acknowledgement messages;

wherein the utilizing of the distributed media access control scheme for allocating, by coordinating comprises:

requesting, by the first device and from the peer devices of the group, to transmit the information and to allow the transmission of acknowledgement messages from the peer devices of the group during at least one distributed reservation protocol (DRP) slot of a time division multiple access (TDMA) frame; and accepting, by peer devices of the group, the request.

24. The computer readable medium of claim 23 wherein the allocating of at least one timeslot for a transmission of acknowledgement messages introduces a delay between a scheduled transmission of a beginning of the information and a scheduled transmission of a last acknowledgement message is responsive to capabilities of the first device.

25. The computer readable medium of claim 23 wherein the acknowledgment message information comprises acknowledgment messages order information.

26. The computer readable medium of claim 25 whereas the order information comprises information for selecting between predefined ordering possibilities of a transmission of acknowledgement messages from the peer devices of the group.

27. The computer readable medium of claim 25 wherein the acknowledgment message information comprises an identity of peer devices of the group and timing information for transmitting acknowledgement messages.

28. The computer readable medium of claim 27 wherein a transmission of acknowledgment messages is responsive to a priority of the peer members.

29. The computer readable medium of claim 25 wherein the stages further comprise updating an identity of peer members that belong to the group in response a reception of acknowledgement messages or an absence of reception of respective acknowledgment messages.

30. The computer readable medium of claim 23, wherein the allocating of the at least one timeslot for the transmission of acknowledgement messages comprises maintaining an order of transmission of acknowledgement messages after temporary losses of at least one beacon frames during at least one time division multiple access frame.

31. The computer readable medium of claim 23, whereas the stages further comprises coordinating transmission of transmission bursts between the first device and the group of peer devices.

32. The computer readable medium of claim 23, wherein a transmission order of acknowledgement messages is responsive to a transmission order of beacon frames.

* * * * *